Sept. 16, 1941.  E. C. FRANCO-FERREIRA  2,255,969
HEAT EXCHANGER
Filed Feb. 29, 1940  2 Sheets—Sheet 1
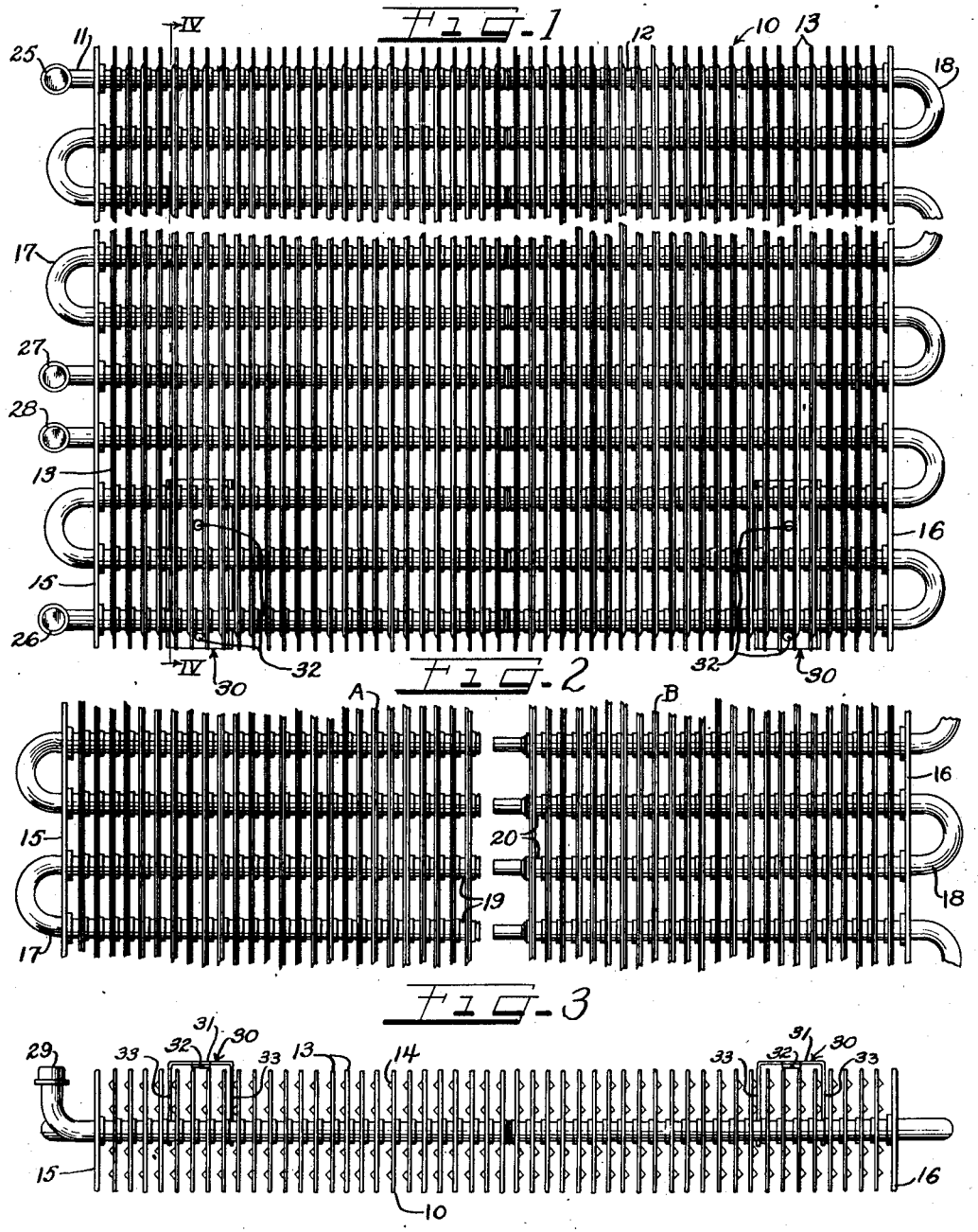
Inventor
Edgard C. Franco-Ferreira Sept. 16, 1941.  E. C. FRANCO-FERREIRA  2,255,969
HEAT EXCHANGER
Filed Feb. 29, 1940   2 Sheets-Sheet 2
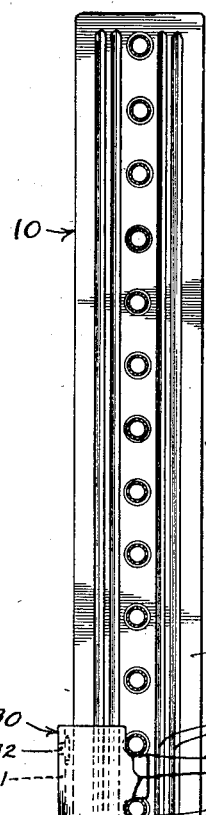
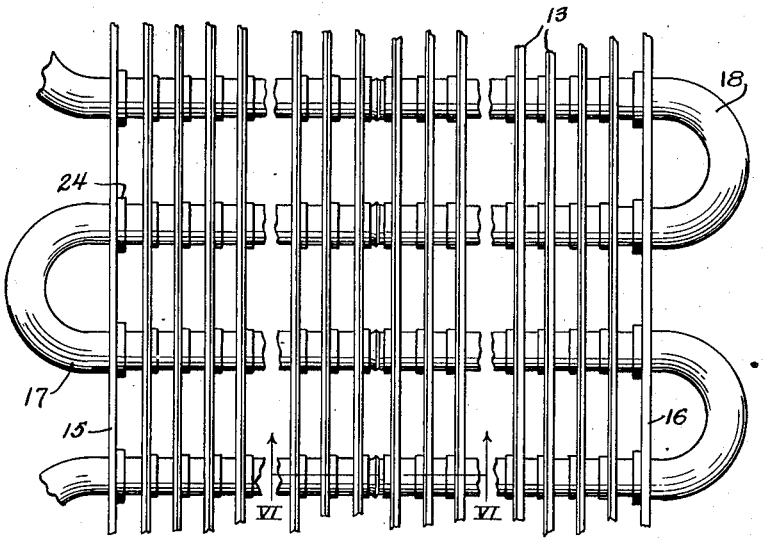
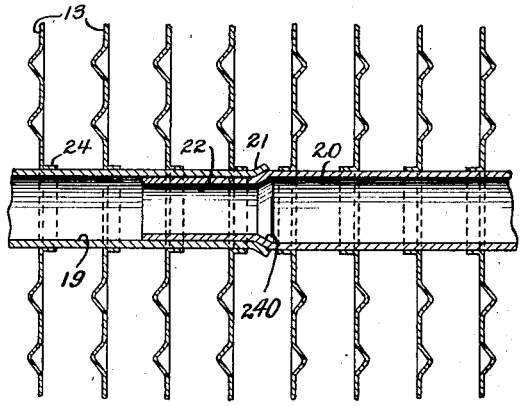
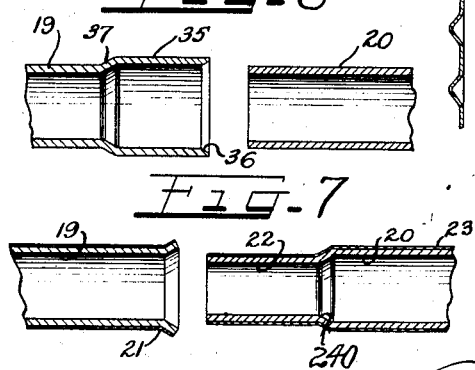
Inventor
Edgard C. Franco-Ferreira Patented Sept. 16, 1941

2,255,969

UNITED STATES PATENT OFFICE 2,255,969

HEAT EXCHANGER

Edgar C. Franco-Ferreira, Chicago, Ill., assignor to Houdaille-Hershey Corporation, Detroit, Mich., a corporation of Michigan Application February 29, 1940, Serial No. 321,417

3 Claims. (Cl. 257—149)

This invention relates to a heat exchange device.

More particularly the invention relates to condensers such as are used in mechanical refrigeration.

This application is a continuation in part of my copending application entitled: "Method of making heat exchange devices," U. S. Serial 241,305, filed November 19, 1938, now Patent No. 2,211,813, dated August 20, 1940.

Heretofore, it has been customary to manufacture condensers and similar types of heat exchangers from a continuous length of tubing bent in a serpentine form, or from straight lengths of tubing, the ends of which are connected to headers provided with return flow communicating passages to form a continuous conduit for the flow of the refrigerant. The continuous type construction is relatively more expensive and the header type construction, using headers formed of metal stampings, is such as to present large areas that must be perfectly sealed if leaks are to be prevented.

It has also been proposed to dispense with headers and employ short U bends for joining the successive ends of straight lengths of tubing forming the body of the condenser, but this has the disadvantage of presenting a great number of joints that must be perfectly sealed. The usual way of sealing such joints is by brazing or solder dipping, neither of which is entirely satisfactory as formerly practiced. In the brazing operation, for instance, it has been customary to employ copper or brass brazing wires that must be individually laid in place adjacent the joint to be brazed, thereby necessitating a considerable amount of manual labor.

In accordance with my present invention, a condenser is first formed in two complementary halves, each comprising hairpin bends of tubing, and the halves so formed are then united in a single brazing operation that also serves to bond the fins to the straight, parallel legs of said tubing. The brazing operation is greatly simplified by first plating the hairpin bends of tubing with copper, which serves as the sole brazing agent in the operation. It is a comparatively simple matter, using the method of my invention claimed in the parent application Serial No. 241,305, to obtain tight joints between the mated ends of the tubing and bonds of high thermal conductivity between the fins and the tubing. Also, my novel construction lends itself admirably to the manufacture of condensers of varying lengths, since with a minimum amount of tooling, the tube length of the hairpin bend may be made longer or shorter, as desired, to give a correspondingly longer or shorter length of condenser.

It is an important object of this invention to provide a novel and improved construction of heat exchange devices, or condensers, that obviates the necessity of headers and that lends itself to more economical production.

A further object of the invention is to provide a heat exchanger or condenser composed of a pair of opposed sections each including U-shaped tubing having the legs thereof inserted through end plates carrying the tubing adjacent the bend thereof and also inserted through fins spaced transversely along the lengths of the tubing legs with the ends of the tubing in the opposed sections being united together.

A further object of the invention is to provide a headerless condenser for refrigeration systems built up from two mating half-sections joined together through the center of the condenser and each carrying a mounting bracket attached to the condenser tube.

Other and further objects of the invention will become apparent to those skilled in the art from the following description of the annexed sheets of drawings which disclose a preferred form of the invention.

On the drawings:

Figure 1 is a broken top plan view of a heat exchanger, or condenser, embodying the principles of my invention.

Figure 2 is a fragmentary view illustrating the method of manufacturing the condenser in two complementary halves.

Figure 3 is an end elevational view of the condenser of Fig. 1.

Figure 4 is a sectional view taken substantially along the line IV—IV of Fig. 1.

Figure 5 is a fragmentary, broken, enlarged plan view of the condenser.

Figure 6 is an enlarged sectional view taken substantially along the line VI—VI of Fig. 5.

Figure 7 is an enlarged fragmentary, cross-sectional view of the mating ends of the tubing prior to assembly.

Figure 8 is an enlarged fragmentary cross-sectional view of a modified form of mating ends for the tubing prior to assembly.

As shown on the drawings:

In Figs. 1, 3 and 4, the reference numeral 10 indicates generally a heat exchange device or condenser embodying the principles of my invention. Said condenser in its finished form comprises lengths of tubing 11, on the straight, parallel legs 12 of which are mounted transversely extending fins 13. Said fins 13 may suitably be provided with longitudinally extending corrugations 14, which serve to increase the heat radiating surface of the fins. In the preferred embobiment of my invention, both the tubing 11 and fins 13 are formed of plain carbon or soft steel. End plates 15 and 16, preferably of dead soft steel, lie outside of the fins 13 and just inside the U-bends of the tubing.

In the manufacture of the condenser 10, steel tubing is first bent into U- or hairpin tubes, such as the tubes 17 and 18 (Fig. 2) with straight, parallel legs 19 and 20, respectively, of the desired length. The legs 19 of the tubes 17 are then flared at their ends 21, as best shown in Fig. 7, to constitute the female members, and the corresponding ends of the legs 20 of the tubes 18 are reduced, as at 22, for insertion into the flared ends 21. The tubes 17 and 18 are then provided for their full lengths, or for the straight lengths thereof, with a coating of brazing material, represented by the layer 23 (Fig. 7), which may suitably be a copper electroplate. The thickness of copper plate is preferably a minimum of about 0.0006 inch, but may be more or less as required. Instead of copper plating the U-bends, a layer of copper, brass or other brazing material may be adherently applied as in powder or paste form to the tubing, or only to the swaged ends thereof.

After the tubes have been copper plated, or otherwise provided with brazing material on their outer surfaces, the end plates 15 and 16 and the fins 13 are mounted in position upon the straight lengths 19 and 20 of the respective tubes 17 and 18. The mounting of the fins and end plates on the straight lengths of the tubes 17 and 18 may be performed before forming the tubes with mating ends, and, as is obvious, must be performed in advance of flaring the ends of the tubes 19. The end plates 15 and 16 and the fins 13 are all provided with annular collars, similar to the collar 24 (Fig. 5) surrounding the tube receiving apertures and the collars and apertures are of such a diameter as to provide a close fit for the legs of the tubing. There are thus formed two complementary halves, represented by the reference letters A and B (Fig. 2) and constituting the tubes 17 and associated end plates 15 and fins 13, and the tubes 18 and associated end plates 16 and fins 13, respectively.

The complementary halves A and B are next joined by forcing the respective ends 21 and 22 of the tubing into a telescopic fit, each reduced end 22 being force fitted into the corresponding flared end 21 until said flared ends 21 rest in abutting relationship against the shoulders 240 of the reduced ends 22 (Fig. 6).

The assembled condenser unit 10 is next subjected to a brazing operation, which may suitably comprise passing the unit into a furnace having a non-oxidizing, or reducing atmosphere heated to a sufficiently high temperature to melt the copper of the electroplate layer 23 and cause the copper to flow into around the joints between the mating ends 21 and 22 of the tubing and between the annular collars 24 of the fins and the outside of the tubing. In general, a temperature of between 1850 and 2000° F. is satisfactory for effecting the brazing of the parts together. Higher or lower temperatures, however, may be used depending upon the metal of which the condenser is made and the composition of the brazing material. In a reducing atmosphere, such as an atmosphere relatively rich in hydrogen, the brazing material flows readily by virtue of capillary action into the close fitting joints, and upon the cooling of the condenser unit after leaving the furnace, the joints will be found to be fluid tight and of high thermal conductivity.

As shown in Fig. 1, the condenser 10 may be provided with two or more ends for connection in a refrigerant system, such as the ends 25 and 26 at the extremities of the tubing, and the ends 27 and 28 intermediate the extremities of the unit. These ends 25 to 28 inclusive are closed by means of caps 29 immediately subsequent to the completion of the condenser units, in order to prevent rusting of the insides of the tubing or the introduction of foreign material into the tubing. These caps 29 are not removed until the condenser unit is actually put into a refrigeration installation.

A pair of mounting brackets 30 for the condenser 10 can be brazed thereon simultaneously with the brazing together of the complementary halves A and B. These brackets can receive bolts (not shown) from a stand or base support to secure the condenser in fixed position in a refrigerator.

Each bracket 30 is a U-shaped metal strip extending vertically upward from the bottom of the unit near the end plates 15 and 16 thereof and straddling several fins of the unit.

The U-shaped members include a flat outer wall 31 with bolt-receiving apertures 32 therethrough and inturned legs 33 extending from the outer wall between the fins 13 to the tube legs. The inner ends of the bracket legs 33 are recessed as at 34 to snugly receive about three tube legs as best shown in Figure 4.

The brackets are merely set in position on the condenser unit and secured to the tube during the regular brazing operation.

Instead of reducing the ends of the tube legs 20 as at 22 (Figs. 6 and 7), the tube legs 20 can remain unreduced as shown in Figure 8 if the ends of the tube legs 19 are enlarged as at 35 to receive the unreduced tube ends.

Thus, as indicated in Figure 8, the ends of the female tubes can be swaged after the fins are assembled thereon, to an inside diameter slightly less than the outside diameter of the male tubes 20 so as to receive the unreduced ends of these tubes in a tight, force-fitting relation. The swaged portions preferably extend back about three-eighths to one-half inch from the ends of the tube legs 19 so as to receive an appreciable length of the male tube therein.

The mouth of each swaged portion 35 has about a 30° bevel 36 therein to facilitate insertion of the male tube. A curved or sloping shoulder 37 connects the swaged portion 35 with the unenlarged portion of the tube legs 19. This shoulder is preferably curved on about .05 inch radius.

The ends of the male tubes 20, or the inside of the swaged portion 35 are coated with brazing material and the male tube ends are force-fitted into the swaged portion 35 of the female tubes until they engage the shoulder 37 of the female tubes. The brazing operation, described above, then permanently unites the telescoped male and female tube legs.

The joints resulting from the operations described above in connection with Figure 8 do not interfere with refrigerant flow through the tubes since the inserted male tubes are unreduced and directly receive fluid from the unreduced portions of the female tubes. The enlarged swaged portion 35 of the female tubes accommodates the telescoping relationship without reducing the cross-sectional flow area of the condenser tube.

It will be evident from the foregoing description that the use of relatively long lengths of tubing to provide hairpin or U-bends for the complementary half sections of the condenser eliminates all joints in the fluid conduits other than the joints along the median line of the condenser when the half sections are united. In accordance with this invention, these joints are of the press fit, telescoping type, so that when brazed, they can readily be made fluid tight. By merely selecting the length of tubing originally necessary to give the desired overall length of condenser, any size of condenser can be made with a minimum amount of tooling.

The use of copper plating, as above described, obviates the use of any other form of brazing material, the copper of the electroplate constituting the sole brazing means for all of the joints of the condenser. This results in considerable saving in manual labor over the application of brazing wire, shims or the like, as has heretofore been customary. If desired, as explained above, the copper plating can be dispensed with and the brazing materials can be applied in paint or paste form to the parts to be joined together. The electroplating operation is only one method of applying copper or other brazing material to the parts.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a condenser unit of the headerless type composed of U-shaped tubes defining a serpentine path and spaced fins mounted on the tubes, the improvement which comprises a pair of U-shaped mounting brackets for the unit extending from one end thereof, each of said brackets straddling a plurality of said fins and having recesses in the legs thereof snugly receiving a plurality of tubes, and metal bonds of high thermal conductivity uniting said fins and said brackets to said tubes.

2. In a heat exchanger unit composed of tubes defining a serpentine path and spaced cooling fins mounted on and bridging said tubes, the improvement which comprises a U-shaped mounting bracket for the unit straddling several of said fins and having recessed legs receiving a plurality of tubes in the recesses thereof and metal bonds of high thermal conductivity uniting said fins and said brackets to said tubes.

3. In a heat exchanger unit composed of tubes defining a serpentine path and spaced fins mounted on and bridging said tubes, the improvement which comprises a mounting bracket for the unit having a recessed portion extending between a pair of adjacent fins, said portion receiving a plurality of tubes in the recesses thereof and metal bonds of high thermal conductivity uniting said fins and said brackets to said tubes.

EDGARD C. FRANCO-FERREIRA.